Feb. 18, 1969   L. J. DAKE   3,428,283
ADJUSTABLE SPACER ASSEMBLY
Filed Sept 11, 1967

INVENTOR:
LEE J. DAKE
BY
ATT'YS

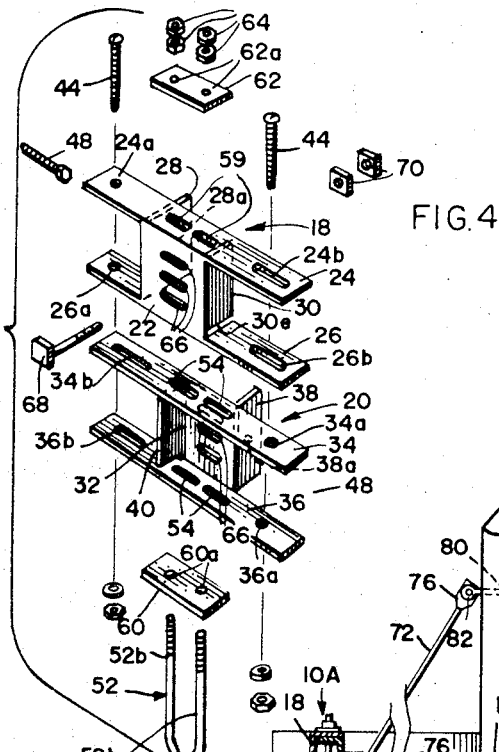

United States Patent Office 3,428,283
Patented Feb. 18, 1969

3,428,283
ADJUSTABLE SPACER ASSEMBLY
Lee J. Dake, Elmhurst, Ill., assignor to Joslyn Mfg. and Supply Co., Chicago, Ill., a corporation of Illinois
Filed Sept. 11, 1967, Ser. No. 666,880
U.S. Cl. 248—214                    17 Claims
Int. Cl. A47b 93/00

ABSTRACT OF THE DISCLOSURE

An adjustable spacer assembly for transverse structural interconnection between a pair of parallel, spaced apart, elongated, structural members such as cross-arms and the like, used on electrical transmission line utility poles, comprising first and second spacers nested together for relative, longitudinal sliding adjustment, each spacer including a pair of longitudinal side flanges in confronting contact with the flanges of the other spacer and having opposite outer end portions in overlying relation with opposite sides of the structural members. Fastening means are provided for securing the structural members to the end portions of the spacer side flanges, and each spacer includes an end flange normal to the side flanges thereof for confronting engagement with one face of a structural member which is normal to the opposite sides thereof. Fastening means are provided for securing the normal flanges to the faces to the structural members, and fastening means are provided to secure the spacers together against relative longitudinal adjustment once an adjustment has been made for a specific spacing between said structural members.

---

The present invention relates to a new and improved adjustable spacer assembly for transverse structural interconnection between a pair of parallel, elongated, spaced apart, structural members such as cross-arms and the like commonly employed on utility poles for supporting transmission lines and other electrical components. More particularly, the invention relates to a spacer assembly which is readily adjustable to accommodate different spacing distances between the cross-arms occasioned by the attachment of the arms on poles of differing diameters or when several pairs of cross-arms are mounted on a pole or poles at points of different diameter thereon.

It is therefore an object of the present invention to provide a new and improved adjustable spacer assembly of the character described.

Another object of the invention is to provide a new and improved adjustable spacer assembly of the type described which is adjustable so that it may be used for structurally interconnecting structural members such as pole line cross-arms having various spacing distances therebetween as occasioned by differing pole diameters.

Yet another object of the present invention is the provision of a new and improved adjustable spacer assembly of the character described which is readily adjustable after it is installed in place between the cross-arms.

Still another object of the invention is the provision of a new and improved adjustable spacer assembly of the character described including means for transmitting compressive and tensile forces between facing sides of the spaced cross-arms and including means for restraining torsional or twisting movement of the arms about their longitudinal axes.

Yet another object of the invention is the provision of a new and improved adjustable spacer assembly of the character described especially adapted for use with cross-arms of rectangular cross section and including means for directly engaging at least three sides thereof.

Still another object of the invention is the provision of a new and improved adjustable spacer assembly of the type described which is adjustable to the desired spacing with a minimal amount of manipulation providing for ease in installation by a workman operating at high elevation above the ground on utility poles and the like.

A further object of the invention is to provide a new and improved adjustable spacer assembly of the character described which is simple in construction, strong, and light in weight, and easy to manufacture at low cost.

Briefly, the foregoing and other objects and advantages of the present invention are realized in one embodiment by the provision of a new and improved adjustable spacer assembly for transverse structural interconnection between a pair of spaced apart, parallel, elongated, structural members, such as cross-arms and the like, which comprises first and second spacers nested together for relative longitudinal sliding adjustment between the cross-arms. Each spacer includes a pair of longitudinal side flanges in confronting contact with the flanges of the other nested spacer and having opposite end portions in overlying relation with opposite sides of the cross-arms. Fastening means are provided for interconnecting the side flange end portions to the cross-arms, and each spacer includes an end flange transverse or normal to the side flanges for confronting engagement with another side of a cross-arm normal to the opposite sides thereof. Fastening means are provided for securing the end flanges to the respective cross-arms, and fastening means are provided for securing the spacers together in nested arrangement against relative longitudinal adjustment, once an adjustment has been made for a specific spacing distance between the cross-arms. The spacer assembly is thus adapted to structurally interconnect cross-arms which may be spaced apart at various different distances, and once the spacer has been adjusted for the specific spacing between the arms and the fastening means have been secured, the arms are tightly held against movement toward or away from each other and against torsional or twisting movement about their respective longitudinal axes.

For a better understanding of the invention, reference should be had to the following detailed description and claims, taken in conjunction with the drawings of an illustrative embodiment, in which:

FIG. 4 is an exploded perspective view of the adjustable spacer assembly of the invention illustrating the component parts making up the assembly;

Figure 2:
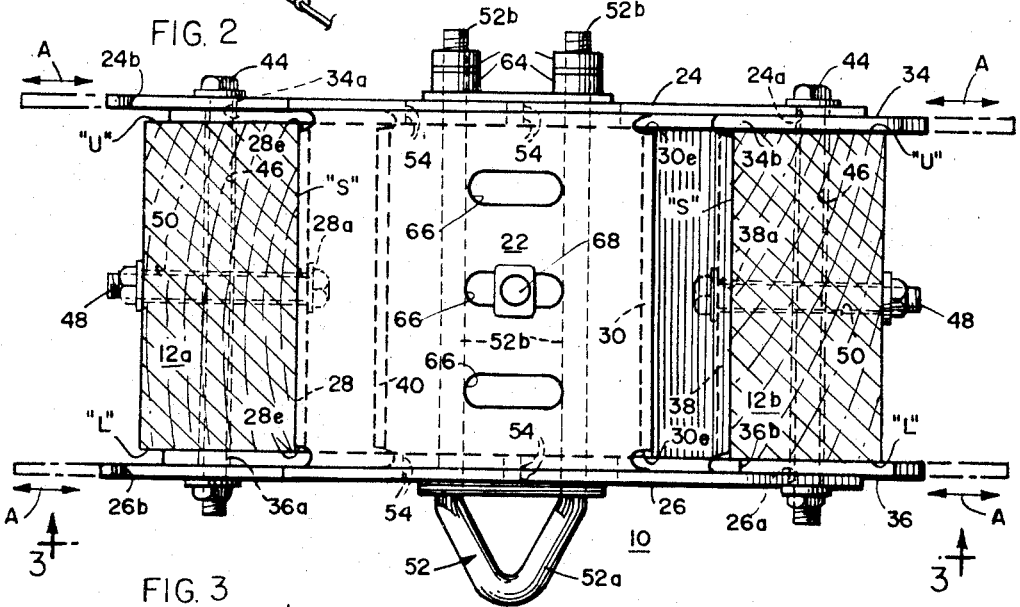
FIG. 2 is a vertical cross-sectional view transversely through the cross-arm taken substantially along the line 2—2 of FIG. 1.

FIG. 5 is a fragmentary, top plan view of the modified form of adjustable spacer assembly in accordance with the invention, looking upwardly in the direction of arrows 5—5 of FIG. 6; and FIG. 6 is a vertical sectional view showing a pair of the modified spacer assemblies of FIG. 5 and a spacer assembly in accordance with FIG. 2, as the assemblies are installed between cross-arms mounted on a pair of utility poles in a typical pole line installation.

Referring now more specifically to the drawings, therein is illustrated one embodiment of a new and improved adjustable spacer assembly constructed in accordance with the features of the present invention and referred to generally by the reference numeral 10 in FIGS. 1 through 4.

The spacer assembly 10 is adapted to structurally interconnect a pair of parallel, spaced apart, elongated cross-arms 12a and 12b which are mounted on opposite sides of an upstanding utility pole 14. Because commercially available utility poles vary in diameter and are generally larger in diameter at the lower end, the spacing distance D (FIG. 1) between the horizontal cross-arms 12 will not always be the same. This spacing distance will depend upon the diameter of the specific pole being used and upon the height at which the cross-arms are attached to the pole, and accordingly the spacer assembly 10 is capable of adjustment in the field in order to accommodate the different spacing distances that are commonly encountered. For example, one embodiment of a spacer assembly 10 was designed to accommodate poles within the range of 11 to 15 inches in diameter, which is the usual range of pole diameters generally encountered in practice on low voltage distribution systems. However, larger or smaller spacer assemblies can be produced to accommodate larger or smaller pole diameter ranges without departing from the spirit of the invention.

Figure 1:
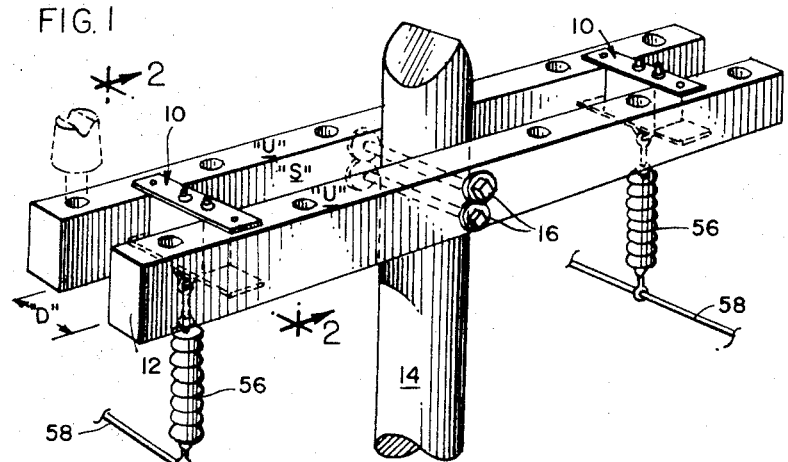
FIG. 1 is a perspective view illustrating a pair of adjustable spacer assemblies in accordance with the invention shown as they are installed between a pair of cross-arms mounted on a utility pole in a typical pole line installation.

Generally, the pole line cross-arms 12a and 12b are rectangular in cross section and are supplied in several standard sizes by the trade. A common size often used is a 5¼" x 10", and the length of the cross-arms may vary considerably, depending upon the number of wires or other electrical components to be supported. When a pair of cross-arms 12a and 12b are mounted on a single pole 10 and bolted thereto by a pair of bolts 16 in typical fashion, as illustrated in FIG. 1, it is generally necessary and desirable to structurally interconnect the outer end portions of the arms on opposite sides of the pole to prevent excessive deflection when load is applied, and to tie the cross-arms together into an integral structural unit of high strength.

In accordance with the invention, the spacer assemblies 10 are mounted to extend transversely of the cross-arms 12a and 12b between opposed, facing, spaced apart inside faces or sides S at positions spaced inwardly from the opposite outer end of the cross-arms to thereby maintain the spacing between the arms and further to prevent the cross-arms from warping or twisting under torsional stress about their respective longitudinal axes.

Each spacer assembly 10 includes a pair of channel shaped, spacer members 18 and 20 nested together for longitudinal relative adjustment in order to accommodate variations in the spacing distance D which occur because of variations in diameter of the poles 14. The spacer 18, which is slightly larger than the spacer 20, includes a vertical web 22 and a pair of upper and lower horizontal longitudinal side flanges 24 and 26 at right angles to the web. The horizontal side flanges 24 and 26 project outwardly in opposite directions beyond the opposite ends of the web 22, and the projecting outer end portions of the other side flange 24 are disposed to overlie upper surfaces U of the cross-arms 12a and 12b while the outer end portions of the lower side flange 26 extend beneath lower surfaces l of the cross-arms.

In addition to the horizontal side flanges, the spacer 18 includes a pair of vertically disposed end flanges 28 and 30 formed at opposite ends of the web 22. The end flanges 28 and 30 are spaced inwardly of the outer ends of the horizontal side flanges 24 and 26, and the larger end flange 28 is disposed in confronting engagement with the vertical inside face S of the cross-arm 12a.

The nested spacer 20 includes a vertical web 32 and a pair of longitudinally extending, upper and lower horizontal side flanges 34 and 36 which project outwardly from the opposite ends of the web. The upper side flange 34 is disposed inside and beneath the upper side flange 24 of the spacer 18, and the lower surfaces of the projecting opposite outer end portions of the side flange bear against the upper surfaces U of both cross-arms 12a and 12b. The lower side flange 36 is disposed inside and above the lower side flange 26 of the spacer 18, and the upper surfaces of the projecting opposite outer end portions of this side flange contact the lower surfaces L of both cross-arms. The spacer 20 is mounted on the larger spacer 18 and is longitudinally movable with the side flanges 34 and 36 nested inside the side flanges 24 and 26 of the spacer 18.

The spacer 20 also includes a pair of vertical end flanges 38 and 40 perpendicular to the side flanges and spaced inwardly from the outer ends thereof at opposite ends of the web 32. The end flange 38 extends in a direction opposite to the end flange 40, and the outer surface is in engagement against the inner side face S of the cross-arm 12b.

The end flanges 30 and 40 of the respective spacers 18 and 20 maintain parallel spacing between the webs 22 and 32, and, to this end, the outer edge of the flange 30 bears against the inside surface of the web 32, while the outer edge of the flange 40 bears against the inside surface of the web 22. In order to permit the inside flanges 34 and 36 of the spacer 20 to project outwardly beyond the end flanges 28 and 30 of the spacer 18, the flanges 28 and 30 are formed with their side edges 28e and 30e, respectively (FIG. 2), spaced inwardly of the inside surfaces of these flanges, and accordingly, the slightly smaller nested spacer 20 is free to slide longitudinally of the spacer 18 without interference with the end flange 28 while the assembly is being adjusted to accommodate a specific spacing distance D on a given installation.

From the foregoing description, it will be seen that the spacer assembly 10 provides positive structural interconnection between the spaced cross-arms 12a and 12b by contacting engagement with the upper and lower surfaces U and L, and the inner side faces S of each cross-arm. Accordingly, the cross-arms are positively held in the desired spaced apart relation, and in addition, warping or twisting of the cross-arms is restrained.

The opposite outer end portions of the longitudinal side flanges 24, 26, 34, and 36 are secured to the respective cross-arms 12a and 12b by a pair of vertical bolts 44 which project downwardly through the flanges and the respective cross-arms. To this end, each arm is provided with a vertical hole 46, appropriately located on the vertical, central, or neutral axis of the arm. The end flanges 28 and 38 are secured to the respective arms 12a and 12b by means of a pair of horizontal bolts 48 which project oppositely outward through the respective flanges and appropriately located holes 50 drilled in the arms on their horizontal, central, or neutral axes. It should be noted that the holes 50 are offset in a horizontal direction from the vertical holes 46 so that there is no interference between the bolts 44 and 48. Because the holes 46 and 50 are drilled on the respective vertical and horizontal neutral axes of the arms 12a and 12b, there is little if any weakening of the arms occasioned by the holes and, in addition, the arms are restrained from twisting or warping about their longitudinal axes in a most efficient manner.

The holes 46 and 50 are slightly larger in diameter than the respective bolts 44 and 48 so that a slight amount of movement of the arms relative to the spacer assembly is permitted before the bolts are tightened. Accordingly, the horizontal bolts 48 are tightened first to draw the inner side faces S of the arms tightly against the respective end flanges 28 and 38, and then the bolts 44 are tightened to compress the arms in a vertical direction between the opposite outer end portions of the upper and lower side flanges 24 and 34, and 26 and 36, respectively. The end flanges 28 and 38 are provided with centrally positioned circular holes 28a and 38a, respectively, which are slightly larger in diameter than the bolts 48 to facilitate insertion of the bolts through the flanges and the holes 50 in the cross-arms.

Figure 3:
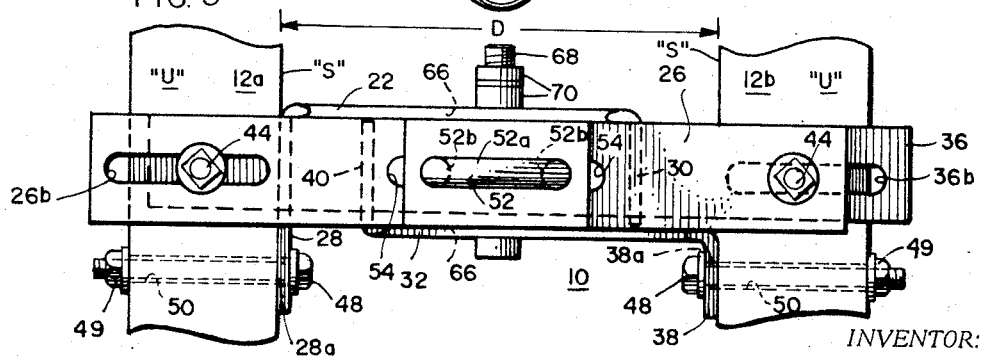
FIG. 3 is a bottom view of the adjustable spacer assembly of FIG. 2 looking upwardly in the direction of arrows 3—3 of FIG. 2.

In order to accommodate the pair of vertical bolts 44 extending downwardly through the center of the arms 12a and 12b, each of the side flanges 24, 26, 34, and 36 includes a circular hole in one end portion and an elongated longitudinal slot in the opposite end portion. The respective side flanges include circular holes 24a, 26a, 34a, and 36a slightly larger in diameter than the bolts 44 which are spaced inwardly from the outer ends of the side flanges but outwardly of the respective end flanges 28 and 38 in order that the bolts 44 will extend through the center of the respective cross-arms. The side flanges also include elongated slots 24b, 26b, 34b, and 36b, respectively, for accommodating the bolts 44 while permitting the spacers 18 and 20 to be adjusted longitudinally relative to one another for different spacing distances D between the cross-arms. Each of the elongated slots is positioned for slidable alignment opposite a circular hole in the adjacent contacting side flange when the spacers 18 and 20 are together in nested relation so that each bolt 44 passes through a pair of circular holes and a pair of elongated slots. Accordingly, the bolts 44 can be inserted as shown in FIGS. 2 and 3, and before they are tightened the spacers 18 and 20 can be adjusted longitudinally, relative to one another, for the desired spacing distance even after the horizontal bolts 48 have been inserted and tightened to draw the cross-arms 12a and 12b up tightly against the respective end flanges 28 and 38.

The spacer assemblies 10 can thus be installed between the cross-arms 12a and 12b with the bolts 48 inserted and tightened and then final adjustment between the spacers 18 and 20 can be made before the bolts 44 have been tightened. Each of the circular holes 24a, 26a, 34a, and 36a and respective adjacent elongated slots 34b, 36b, 24b, and 26b cooperate to positively position and maintain the bolts 44 in the center of the cross-arms 12a and 12b, and each pair of holes 24a and 26a and 34a and 36a can be used to guide a drill or auger for forming the holes 46 in the respective cross-arms if the holes have not already been drilled prior to the installation of the arms on the pole 14.

Once the spacer assembly 10 has been installed between the cross-arms 12a and 12b and the horizontal bolts 48 have been installed and tightened, the spacers 18 and 20 are adjusted relative to each other in a longitudinal direction to provide the desired spacing distance D. In adjusting the spacer assembly 10 to accommodate the desired spacing distance D between the opposing faces S of the cross-arms 12a and 12b, the nested spacers 18 and 20 are moved longitudinally relative to one another, as indicated by the arrows A in FIG. 2. As shown by the dotted line extensions of the side flanges 24, 26, 34, and 36 in FIG. 2, the spacers can be moved to an expanded position increasing the spacing distance D. The maximum extension of the spacer assembly is positively limited by engagement of the end flanges 30 and 40 with the legs 52b of the U-bolt 52 and a minimum spacing position is achieved by moving the spacers inwardly until the outer faces of the end flanges 30 and 40 are touching or adjacent to the heads of the horizontal bolts 48. Regardless of the spacing distance D for a given installation, the bolts 44 are always extended through the vertical neutral axes of the respective cross-arms 12a and 12b because the distance between the center of the holes 34a and 36a and the flange 28 on the one hand and the distance between the holes 24a and 26a and the flange 38 on the other hand is fixed at one-half the horizontal width or thickness of the cross-arms being used. Of course, if cross-arms of different width are used, spacing of the holes from the end flanges must be adjusted accordingly, and if cross-arms of different vertical height or depth are used the size of the spacers 18 and 20 that are used is adjusted to accommodate. For the most part, however, cross-arms of standard cross section will be used, and a single size of spacers 18 and 20 is appropriate.

After the vertical bolts 44 are installed and tightened, thus locking the spacers 18 and 20 together, further longitudinal adjustment therebetween is prevented because the outer end portions of the side flanges 24 and 34 are pressed together with the inner flange 34 bearing against the upper surfaces U of the cross-arms. Similarly, the outer end portions of the side flanges 26 and 36 are pressed tightly together with the inner flange 36 bearing against the lower surfaces L on the cross arms.

Once both the vertical bolts 44 and the horizontal bolts 48 have been inserted and tightened as described, the outer end portions of the cross-arms 12a and 12b are firmly structurally interconnected and are maintained with the desired spacing distance D bewteen the opposing inside faces S of the arms. The end flanges 28 and 38 bear directly against the inside faces S of the arms, and the inside surfaces of the opposite end portions of the upper and lower side flanges 34 and 36 bear directly against the upper and lower surfaces U and L of the arms, respectively. The inside surfaces of the side flanges 34 and 36 bearing directly against the upper and lower faces of the cross-arms aid in positively restraining the arms 12a and 12b from warping longitudinally or twisting about their respective longitudinal axes, and an extremely strong structural interconnection between the cross-arms 12a and 12b is provided.

The spacer assembly 10 has an important advantage of being adjustable in length even after it has been mounted in place and the bolts 48 have been tightened. Moreover, because three out of the four sides of each cross-arm are directly confronted by flange portions of the spacer assembly, great structural strength is attained.

In order to aid in maintaining each pair of spacers 18 and 20 in a nested condition for ease in handling before as well as during and after installation of a spacer assembly 10 and further, to help maintain the nested spacers 18 and 20 against relatively longiutdinal movement after adjustment to provide the correct spacing distance D has been accomplished, the spacer assembly includes a centrally located, vertically extending U-bolt 52 having a lower bight portion 52a and a pair of upwardly extending parallel legs 52b which pass upwardly through the side flanges 24, 26, 34, and 36. Each side flange is provided with a pair of parallel, longitudinally extending, spaced apart slots 54 adjacent the central portion thereof. The slots 54 are parallel with the slots 24b, 26b, 34b, and 36b previously described, and each is adapted to accommodate one leg 52b of the U-bolt projecting upwardly therethrough and permit relative longitudinal adjustment of the nested spacers 18 and 20 until the U-bolt is tightened. The lower bight portion 52a of the U-bolts extends downwardly below the lower side flange 26 of the spacer 18 and supports the upper end of an insulator string 56, which in turn supports a power cable 58 or other electric component (FIG. 1).

A rectangular, lower washer plate 60 with a pair of spaced holes 60a (FIG. 4) for the legs 52b of the U-bolt is mounted on the U-bolt adjacent the underside of the lower side flange 26 to limit the upward extension of the U-bolt through the spacers, and similarly, an upper washer plate 62 with spaced holes 62a for the U-bolt legs 52b is mounted on the upper surface of the upper flange 24. Nuts 64 are provided for threaded engagement on the upper end portions of each U-bolt leg 52b, and when the nuts are tightened, the U-bolt compresses the upper and lower washer plates 62 and 60 against the respective upper and lower side flanges 24 and 26. The outer side flanges 24 and 26 are in turn compressed against the inner side flanges 34 and 36 of the spacer 18 and further aid in preventing relative longitudinal movement between the spacers 18 and 20, once the U-bolt nuts 64 have been tightened. The elongated slots 54 adjacent the central portion of each spacer side flange permit relative longitudinal adjustment of the spacers 18 and 20 with the U-bolt inserted while the nuts 64 are loosened on the U-bolt legs 52b and the spacers are thus maintained loosely in the desired nested relation, thereby facilitating the manipulation and adjustment of the loosely assembled spacer 10 prior to and during installation between a pair of the cross-arms.

The webs 22 and 32 of both spacers 18 and 20 are formed with several (preferably three) parallel, elongated, longitudinally extending slots 66, located adjacent the central portion of the webs, and one or more horizontally extending bolts 68 are provided to extend through these slots to force the webs of the spacers toward one another when a pair of nuts 70 are tightened on the outer threaded end portions of the bolts. The slots 66 permit relative longitudinal movement between the nested spacers 18 and 20 while one or more bolts 68 is extended through the webs 22 and 32, and after the proper adjustment has been made for a given spacing distance D, the nuts 70 are tightened to aid in maintaining the spacers against subsequent relative longitudinal movement.

To facilitate handling of the spacer assemblies 10 before and during the installation of the spacer assembly between the cross-arms 12a and 12b, the U-bolt 52 and at least one bolt 68 are inserted in place on the spacers 18 and 20 with the nuts 64 and 70 in loosened condition. The bolts maintain the spacers 18 and 20 in the desired nested relation, yet permit longitudinal adjustment between the spacers until the nuts 64 and 70 are tightened and thus the spacers 18 and 20 are prevented from becoming separated from one another during handling and installation of the spacer assemblies. Once the desired longitudinal adjustment between the spacers 18 and 20 has been accomplished, the nuts 64 and 70 are tightened and help to hold the nested spacers against subsequent longitudinal relative movement.

The bolts 68 and nuts 70 tightened thereon, urge the webs 22 and 32 of the spacers toward one another so that the outer edge of the end flange 40 bears tightly against the inside surface of the web 22 and the outer edge of the end flange 30 bears tightly against the inside surface of the web 32. The end flanges and webs of the respective spacers thus directly engage one another to help maintain the webs in parallel relation while restraining the spacers against relative longitudinal movement. The lower bight portion 52a of the U-bolt 52 provides a convenient means for supporting electrical components from the spacer assembly 10 and, in addition, the U-bolt aids in restraining the spacers 18 and 20 against relative longitudinal movement, once the nuts 64 are tightened.

Before installation of a spacer assembly 10 between a pair of cross-arms 12a and 12b, the spacers 18 and 20 are maintained loosely in the desired nested relation, as shown in FIGS. 2 and 3 by the U-bolt 52 extended through the slots 54 in the side flanges and one or more bolts 68 extended through the slots 66 in the webs 22 and 32. The loosely assembled spacer assembly is then mounted in place extending transversely between the cross-arms at the desired location. The horizontal bolts 48 are inserted through the holes 28a and 38a in the respective end flanges 28 and 38 and extend through the horizontal holes 50 in the respective cross-arms. Nuts 49 are tightened on the horizontal bolts 48 to draw the surfaces S of the cross-arms against the respective end flanges 28 and 38. The proper spacing distance D between the side faces S of the arms is then established by moving the spacers longitudinally of one another and the vertical bolts 44 are then inserted through the pairs of confronting holes and adjacent slots in the side flanges. The bolts 44 extend through the vertical holes 46 in the cross-arms and the nuts 45 are tightened on the outer ends of the bolts to hold the cross-arms firmly in place. Finally, the nuts 64 and 70 are tightened and the installation of the spacer assembly is complete.

The spacer assembly 10 of the invention is capable of fast, easy installation on a pair of cross-arms mounted on poles of varying diameters and is easily adjusted while partially installed to accommodate the desired spacing distance D between the arms. After installation of the spacer assembly is complete, an extremely strong structural interconnection between the arms is established.

The U-bolt 52 serves a dual function in helping to permanently maintain the selected longitudinal adjustment established between the spacers 18 and 20 and in providing a convenient means for connecting and supporting a power line or other electrical component from the spacer assembly. Location of the horizontal bolts 44 and vertical bolts 48 on the respective horizontal and vertical neutral axes of the respective cross-arms provides for a maximum strength connection and because the spacer flanges are in engagement with three side faces of each cross-arm, the arms are positively restrained against twisting and warping longitudinally.

Referring now to FIGS. 5 and 6 of the drawings, therein is illustrated a modified form of spacer assembly in accordance with the present invention and referred to generally by the reference numeral 10A. The spacer assemblies 10A are substantially identical to the spacer assembly 10 previously described except that provision is made for connecting the spacer directly to a diagonal tension rod 72 or the like, as illustrated in FIG. 6. To this end, the spacer assembly 10A includes two or more horizontal bolts 68 disposed to extend through the slots 66 provided in the webs 22 and 32 of the spacers. The bolts 68 extend through suitable holes provided in the web of a vertically disposed channel bracket 74 mounted on the outer surface of the web 32 of the spacer 20.

FIG. 6 illustrates a typical twin pole installation wherein a pair of parallel, spaced apart poles 14a and 14b are used to support a pair of relatively long cross-arms 12a and 12b which in turn support three transmission lines 58. In this installation, a single spacer assembly 10, as previously described, is used to interconnect the pair of cross-arms at a position midway between the spaced poles and a pair of spacer assemblies 10A are used to structurally interconnect the cross-arms outboard of the poles. The power cables 58 are supported on insulator strings 56 which are hung from the U-bolts 52 of the respective spacer assemblies 10 and 10A and the pair of outboard spacer assemblies 10A are adapted to be structurally interconnected directly to the respective adjacent poles 14a and 14b by means of the tension rods 72.

Each of the diagonal tension rods 72 includes a clevis type fitting 76 at its opposite ends and the clevis fittings on the lower end of the rods extends between a pair of outwardly extending vertical side flanges on the channel brackets 74 of the respective outboard spacer assemblies 10A. The lower clevis fittings 76 are interconnected to the flanges of the brackets 74 by means of bolts 78 which extend through the suitable holes in the flanges and the clevis. The clevis fittings 76 on the upper end of the diagonal tension rods 72 are connected to the respective poles 14a and 14b by means of eyebolts 80, which extend horizontally through the poles. The upper clevis on each tension rod 72 is bolted to an eyelet of one of the eyebolts 80 by a bolt 82 and, if desired, the opposite ends of each eyebolt are interconnected by a central horizontal tension rod 84 having clevis fittings 86 at opposite ends. The clevis fittings 86 are bolted to brackets 90 by bolts 88, and the brackets are mounted on the eyebolts 80 in an appropriate manner.

In addition to structurally interconnecting the cross-arms 12a and 12b outboard of the respective poles 14a and 14b and supporting the respective power lines 58, each outboard spacer assembly 10A is structurally interconnected to the adjacent pole by means of the diagonal tension rod 72. Accordingly, downward bending of the outer end of the cross-arms is restrained and an extremely strong support structure is provided for supporting the power cables 58. The channel brackets 74 on the inwardly facing webs of the spacer assemblies provide convenient means for connecting the spacer assemblies to the diagonal tension rods, and the bolts 68 transmit any stress exerted by the tension rods directly to the spacers 18 and 20. The brackets 74 are easily mounted on the spacer assemblies with no changes being required except for the addition of one or more bolts 68.

Although the present invention has been described by reference to two embodiments thereof, it will be apparent that numerous other modifications and embodiments will be devised by those skilled in the art which will fall within the true spirit and scope of the present invention.

What is claimed as new and desired to be secured by Letters Patent of the United States is:

1. An adjustable spacer assembly for transverse structural interconnection between a pair of parallel, spaced apart, elongated pole line structural members, said assembly comprising first and second spacers nested together for relative longitudinal sliding adjustment therebetween, each of said spacers including a pair of longitudinal side flanges disposed in nested facing relation with the side flanges of the other spacer, and having opposite outer end portions in overlying relation with opposite sides of said structural members, first fastening means for securing said end portions to said structural members, each spacer including a flange normal to said side flanges in confronting contact with a side of a structural member normal to said opposite sides thereof, second fastening means for securing said normal flange to said structural members, and third fastening means extending transversely through said spacers for holding said spacers in selected nesting relation against longitudinal relative adjustment, once adjustment has been made for a selected spacing between said structural members.

2. The spacer assembly of claim 1 wherein each spacer includes a web between said longitudinal side flanges in parallel facing relation with the web of the other spacer, said webs having opposite ends spaced inwardly of the outer ends of said side flanges.

3. The spacer assembly of claim 2 wherein the longitudinal outer edge of a side flange on one spacer bears against the web of the other spacer for maintaining the webs in spaced parallel relation.

4. The spacer assembly of claim 2 wherein said normal flange of each spacer is formed at one inwardly spaced end of said web.

5. The spacer assembly of claim 2 wherein each spacer includes a second normal end flange having an outer edge bearing against the web of the other spacer.

6. The spacer assembly of claim 1 including bracket means mounted on the web of one of said spacers for structural interconnection with the pole supporting said structural members.

7. The spacer assembly of claim 6 wherein said bracket means is supported on said web by said third fastening means.

8. The spacer assembly of claim 1 wherein each side flange of one spacer is in confronting contact with a side flange of the other spacer whereby the opposite end portions thereof form pairs of confronting end portions overlying said opposite sides of said structural members, one end portion in each confronting pair defining an opening therein slightly larger than said first fastening means extended transversely therethrough and the other end portion of the pair defining an elongated longitudinal slot overlying said opening whereby longitudinal relative adjustment of said spacers is permitted with said first fastening means extended through the opening and slot in said pair of confronting end portions.

9. The spacer assembly of claim 1 wherein said third fastening means includes bolt means extending transversely through the side flanges of said spacers intermediate the opposite end portions thereof.

10. The spacer assembly of claim 9 wherein said side flanges include longitudinally extending slots for permitting longitudinal relative adjustment between said spacers while said bolt means is extended through said side flanges.

11. The spacer assembly of claim 2 wherein said third fastening means includes bolt means extending transversely through the webs of said spacers.

12. The spacer assembly of claim 11 wherein said webs are formed with at least one longitudinally extending slot therein for permitting longitudinal relative adjustment between said spacers while said bolt means is extended through said webs.

13. An adjustable spacer assembly for transverse structural interconnection between a pair of parallel, elongated pole line structural members, said assembly comprising first and second channel-shaped spacers nested together for relative longitudinal sliding movement therebetween, each of said spacers including a web disposed in facing parallel relation to the web of the other spacer and a pair of longitudinal side flanges disposed in nested facing relation with the side flanges of the other spacer, selected ones of said side flanges each including opposite outer end portions in confronting contact with opposite sides of said structural members, first fastening means for securing said end portions to said structural members, each spacer including a pair of end flanges disposed at opposite ends of said web and normal to the side flanges thereof, selected ones of said end flanges in confronting contact with sides of said structural members normal to said opposite sides thereof, second fastening means for securing said selected ones of said end flanges to said structural members, selected others of said end flanges having outer edges bearing against said webs of said spacers, and third fastening means extending transversely through said spacers intermediate their ends for holding said spacers in selected nesting relation against longitudinal relative movement after adjustment has been made for a selected spacing between said structural members.

14. The adjustable spacer assembly of claim 13 wherein selected others of said side flanges include opposite outer end portions in confronting contact with the end portions on said selected ones of said side flanges to form pairs of confronting end portions, one end portion in each pair of confronting end portions defining an opening slightly larger than said first fastening means extended transversely therethrough and the other end portion including longitudinally extending slot means defined to overlie said opening for permitting longitudinal relative movement between said spacers with said first fastening means extended transversely through said pair of end portions into an adjacent structural member.

15. The adjustable spacer assembly of claim 13 wherein the webs and side flanges of said spacers are formed with longitudinally extending slots therein, said third fastening means including first bolt means extending transversely through the slots in said side flanges and second bolt means normal to said first bolt means and extending transversely through said slots in said webs.

16. The spacer assembly of claim 15 including bracket means mounted on the web of one of said spacers including flanges extending transversely outwardly thereof for structural interconnection with the pole supporting said structural members.

17. The spacer assembly of claim 16 wherein said bracket means includes a web portion secured to said web of said one spacer with said second bolt means.

References Cited

UNITED STATES PATENTS

| | | | |
|---|---|---|---|
| 1,652,431 | 12/1927 | Ellis | 52—40 X |
| 1,744,662 | 1/1930 | Neville | 52—697 X |
| 1,885,318 | 11/1932 | Austin | 174—45 |
| 2,045,150 | 6/1936 | Kenneally | 52—721 X |
| 2,721,362 | 10/1955 | McCoy et al. | 174—43 |

ROY D. FRAZIER, *Primary Examiner.*

J. FRANKLIN FOSS, *Assistant Examiner.*

U.S. Cl. X.R.

174—45; 52—697, 721